Sept. 4, 1923.
G. E. SALL
RIM TOOL
Filed Feb. 13, 1922
1,466,964
3 Sheets-Sheet 1
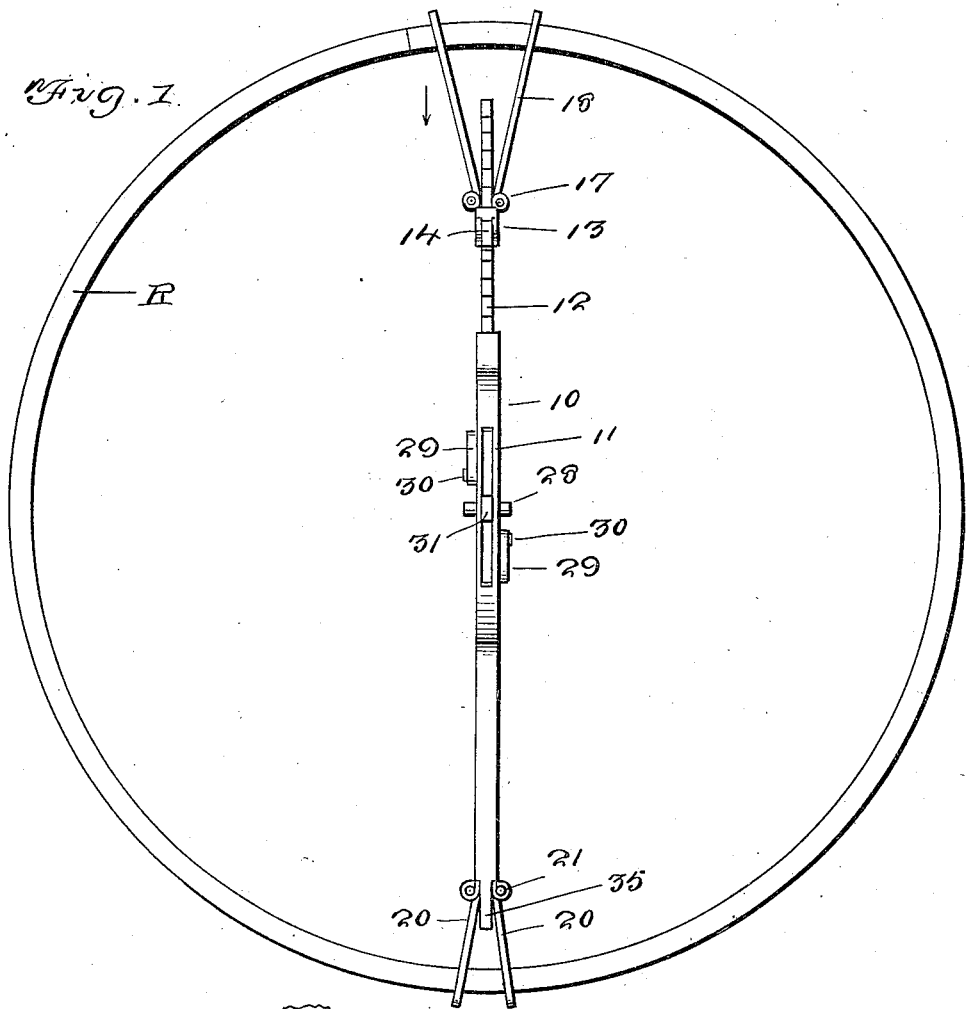
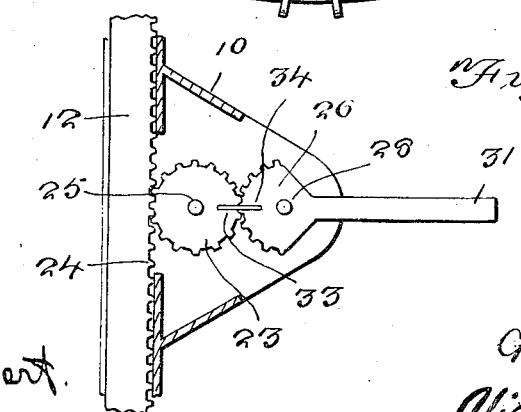

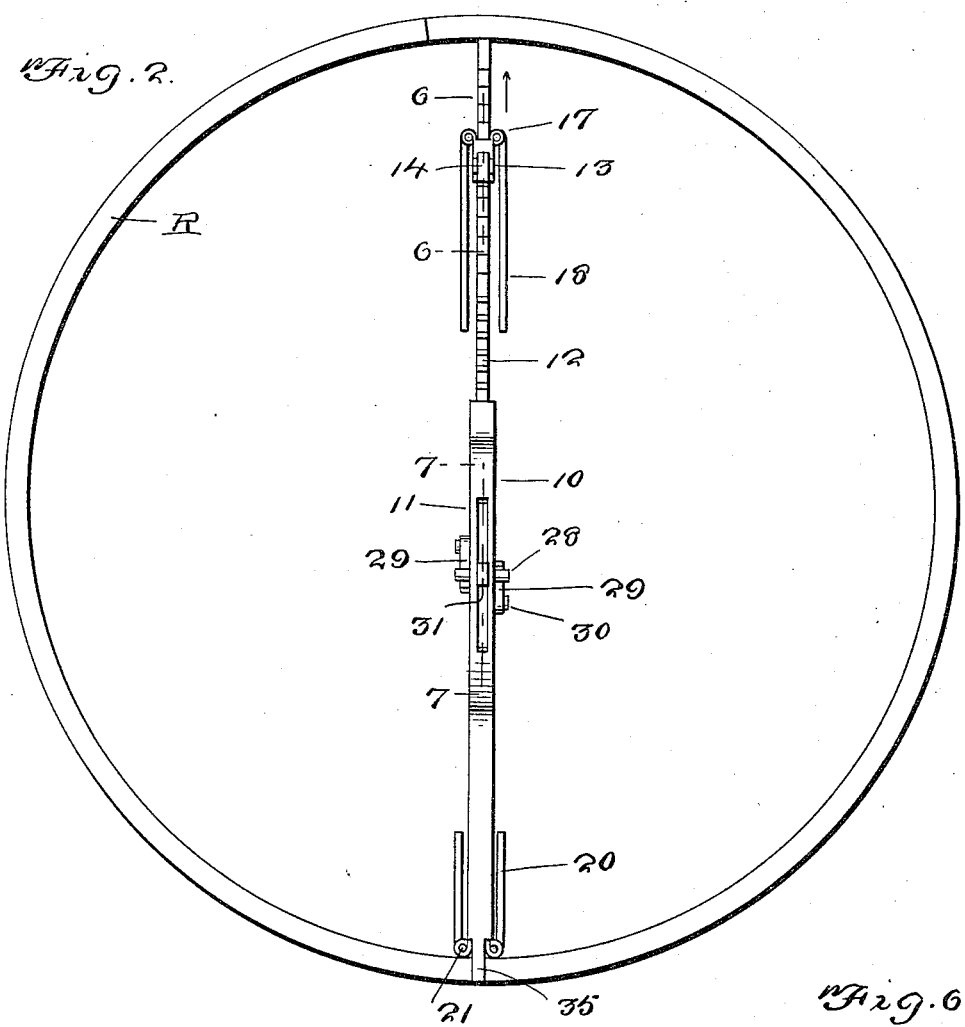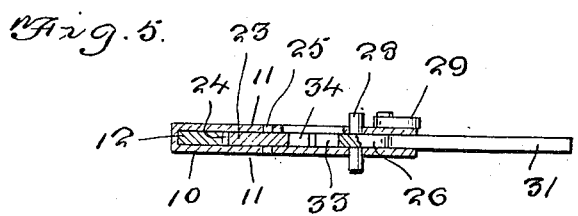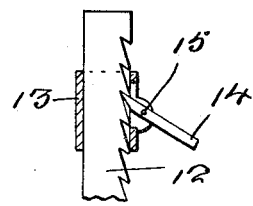

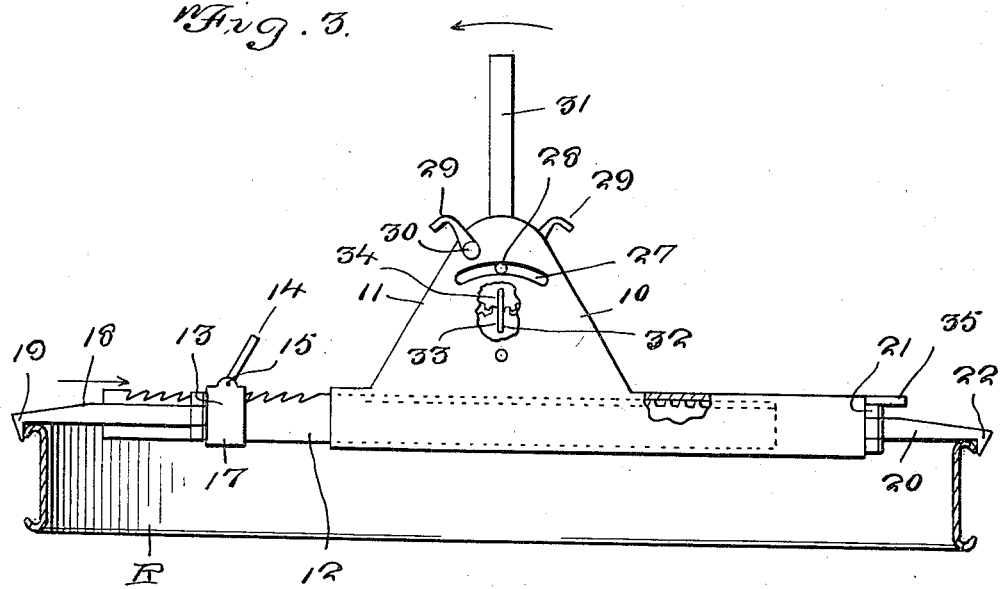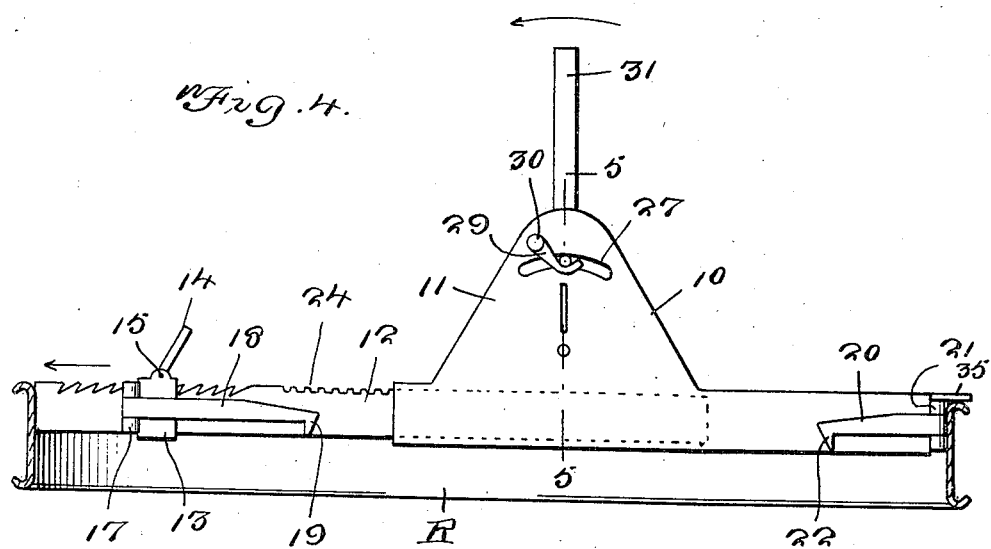

Patented Sept. 4, 1923.

1,466,964

UNITED STATES PATENT OFFICE.

GEORGE E. SALL, OF GREELEY, COLORADO.

RIM TOOL.

Application filed February 13, 1922. Serial No. 536,245.

*To all whom it may concern:*

Be it known that I, GEORGE E. SALL, a citizen of the United States, residing at Greeley, in the county of Weld and State of Colorado, have invented new and useful Improvements in Rim Tools, of which the following is a specification.

This invention relates to tire tools.

An object of the present invention is the provision of a tool of this character, by means of which a rim of the transversely split demountable type may be contracted for the removal of a tire and expanded for replacing the same, with a minimum amount of labor and in a relatively short time.

Another object of the invention is the provision of a tool of this character which may be easily and quickly adjusted so as to permit of its use for either contracting or expanding a rim.

A further object is the provision of a tire tool which includes the above and other advantages and which in addition is capable of being compactly folded so as to enable it to be stored in a relatively small space.

With the above and other objects in view, the invention further includes the following novel features and details of construction, to be hereinafter more fully described, illustrated in the accompanying drawings and pointed out in the appended claims.

In the drawings:—

Figure 1 is a plan view of the rim of a demountable type with the tool in position for contracting the rim.

Figure 2 is a similar view with the tool in position for expanding the rim.

Figure 3 is an elevation of the tool partly broken away and shown in position for contracting operation.

Figure 4 is a like view with the parts in position for expanding.

Figure 5 is a section on the line 5—5 of Figure 4.

Figure 6 is a similar view on the line 6—6 of Figure 3.

Figure 7 is a like view on the line 7—7 of Figure 3.

Referring in detail to the drawings, wherein like characters of reference denote corresponding parts, the reference character 10 indicates a casing which includes substantially parallel side walls 11. The casing 10 is formed to provide a guide for a longitudinally movable bar 12 which extends through each end of the casing and is provided upon one end with a sleeve or collar 13. This sleeve or collar 13 surrounds the casing and is capable of being adjustably held against movement in one direction by means of a dog 14, the latter being pivotally mounted as indicated at 15 in the collar 13 and adapted for engagement with teeth 16 provided in the edge of the bar 12. Pivotally connected to each side of the sleeve or collar 13 as shown at 17, is an arm 18, the free ends of these arms being provided with hooks 19, which are adapted for engagement over the opposite side edges of a rim R.

Pivotally secured to the casing 10 opposite the end of the bar 12 which carries the arms 18, is a pair of arms 20. These last mentioned arms are each pivotally secured to the casing 10 as shown at 21 and like the arms 18 have their outer free ends provided with hooks 22 for engagement over the edges of the rim R.

Mounted for rotation within the casing 10 between the side walls 11, is a gear 23, the teeth of which engage teeth 24 provided upon the adjacent edge of the bar 12. The gear 23 is mounted upon a short shaft 25, having bearings in the side walls 11 and is engaged by the teeth of a segment 26. The segment is located between the walls 11 of the casing 10 and is capable of pivotal movement therebetween and for this purpose has extending from each side thereof through segmental slots 27 in the walls 11, a trunnion 28. These trunnions are adapted to be engaged by hooks 29 which are pivotally connected to each side of the casing as shown at 30. When engaged with the trunnions 28 these hooks form a bearing for the said trunnion so that the segment 26 may be rocked within this bearing. Extending from the segment 26 is a handle 31 for convenience of operation.

When it is desired to contract a wheel rim, the tool is arranged in the position shown in Figure 1 of the drawings, that is, with the hooks 19 and 22 of the arms 18 and 20 respectively, engaged over the edges of the rim R. The hooks 29 are disengaged from the trunnions 28 and the segment 26 and the gear 22 are locked together so as to move as a unit. For this purpose, there is provided a pin 32, which is engageable in slots 33 and 34 provided respectively in the segment 26 and gear 23. This rocking movement moves the bar 12 inwardly when the handle 31 is moved in the direction of the arrow.

When it is desired to expand the rim R. the arms 18 are folded inwardly along each side of the bar 12, the hooks 29 are engaged over the trunnions 28 and the pin 32 adjusted so as to permit of independent rotary movement between the gear 23 and segment 26. The segment 26 may then be rocked upon the trunnions 28 and when the handle 31 is moved in the direction of the arrow, the bar 12 will be moved outwardly or in the same direction, through the rotary movement imparted to the gear 23.

In order to hold the tool in position when the rim is expanded, the casing 10 is provided with an arm or extension 35 which is adapted to bear upon the edge of the rim when the end of the casing abuts the inner periphery of the rim.

The invention is susceptible of various changes in its form, proportions and minor details of construction and the right is herein reserved to make such changes as properly fall within the scope of the appended claims.

Having described the invention what is claimed is:—

1. A tire tool comprising a casing, a longitudinally movable bar, rim engaging elements at one end of the bar, rim engaging elements at one end of the casing, a gear mounted for rotation within the casing and engageable with teeth formed on the bar, a segment engageable with the gear, whereby the latter may be operated to move the bar in one direction and means for locking the segment and gear together, whereby the bar may be moved in an opposite direction.

2. A tire tool comprising a casing, a longitudinally movable bar, rim engaging elements at one end of the bar, rim engaging elements at one end of the casing, a gear mounted for rotation within the casing and engageable with teeth formed in the bar, a segment engageable with the gear, whereby the latter may be operated to move the bar in one direction and a pin and slot connection between the segment and gear, whereby the same may be locked together to move the bar in an opposite direction.

3. A tire tool comprising a casing, a longitudinally movable bar, rim engaging elements at one end of the bar, rim engaging elements at one end of the casing, a gear mounted for rotation within the casing and engageable with teeth formed on the bar, a segment engageable with the gear, a pivotal bearing for the segment, whereby operation of the latter will impart rotation to the gear to move the bar in one direction, means whereby the segment may be disengaged from the bearing and means whereby the segment and gear may be rocked together to move the bar in an opposite direction when the segment is disengaged from said bearing.

4. A tire tool comprising a casing, a longitudinally movable bar, rim engaging elements at one end of the bar, rim engaging elements at one end of the casing, a gear mounted for rotation within the casing and engageable with teeth formed on the bar, a segment engageable with the gear, pivotally mounted hooks forming a bearing for the segment, whereby the latter will impart rotation to the gear to move the bar in one direction and means whereby the segment and gear may be locked together to rock the gear and impart movement to the bars in an opposite direction when the hooks are disengaged from the segment.

In testimony whereof I affix my signature.

GEORGE E. SALL.